March 28, 1967 D. G. KINDERSLEY 3,311,016

PRINTING PROCESSES

Filed Jan. 20, 1964

INVENTOR:
DAVID GUY KINDERSLEY
ATTORNEYS:
Watson, Cole, Grindle & Watson 3,311,016

PRINTING PROCESSES

David Guy Kindersley, Dales Barn, Barton, Cambridge, England

Filed Jan. 20, 1964, Ser. No. 338,714
4 Claims. (Cl. 88—14)

This application is a continuation-in-part of application Serial No. 212,642, filed July 26, 1962.

The invention relates to printing processes and has particular reference to a method of spacing characters for use in printing processes, and to the products of the method.

In known printing processes each set of characters (e.g. an alphabet in Times print) which it is desired to reproduce must be spaced by eye individually. The spacing by eye of a set of characters is a long and arduous task.

It is an object of the invention to provide a method of spacing characters in which it is necessary to space by eye only an arbitrary set of characters and to space any desired set of characters from the results obtained from the arbitrary set.

The invention provides a method of determining lateral spacings for a set of characters in printing processes which comprises, for each character of the set, the steps of determining the light value of the character by measuring the amount of light which passes through a transparent image of the character and then determining the unknown lateral space value for the character by reading off the lateral space value from recorded values which have been determined by selecting a lateral space value for each character of the set of arbitrary characters, determining in the manner aforesaid the light value for each of the arbitrary characters and recording the space value against the light values.

The invention further provides a method of spacing a set of characters for use in printing processes which comprises the steps of determining the lateral space value of each character of an arbitrary set of characters, measuring the amount of light (i.e. the light value) passing through a transparent image of the arbitrary characters, tabulating or plotting the light values against the space values for the set of arbitrary characters and, for each character it is desired to space, measuring the light value in a similar manner and determining the lateral space value for that character by reading off the corresponding space value from the tabulated or plotted values.

If desired the space values read off from the table or graph may be each increased or decreased by a constant.

In one embodiment the light value is measured by placing a transparent image of the character transversely to a beam of light of which the intensity increases at least laterally of the character from both sides of a centre having a minimum amount of light, or no light, the image being placed or adjusted in the beam so that equal amounts of light pass through the image on either side of the centre of the beam (i.e. with its optical centre at the centre of the beam), and measuring the amount of light passing through the image with a light sensitive device.

If desired the intensity of the beam may increase in all directions from the centre.

Preferably the varying intensity of the beam is produced by means of a light wedge.

Conveniently the light values may be plotted against the space values on a graph.

In a further embodiment the lateral space value of an arbitrary character is determined by placing on one side of the arbitrary character two characters spaced apart by a fixed spacing and then moving the said two characters as a unit laterally of the arbitrary character until the centre character of the three characters appears, to the eye, to be equally spaced between the other two characters, repeating the operation with the said two characters on the other side of the arbitrary character and with the said two characters reversed (i.e. with the same character adjacent the arbitary character) and determining the lateral space value from the distance between the two positions of the character adjacent the arbitrary character.

Preferably the heights of all the characters are the same with or without ascenders and descenders.

A specific example of a method of spacing characters according to the invention will now be described with reference to the accompanying drawings in which.

Figures 1, 2, 3, 4, 5, 6, 7, 8:
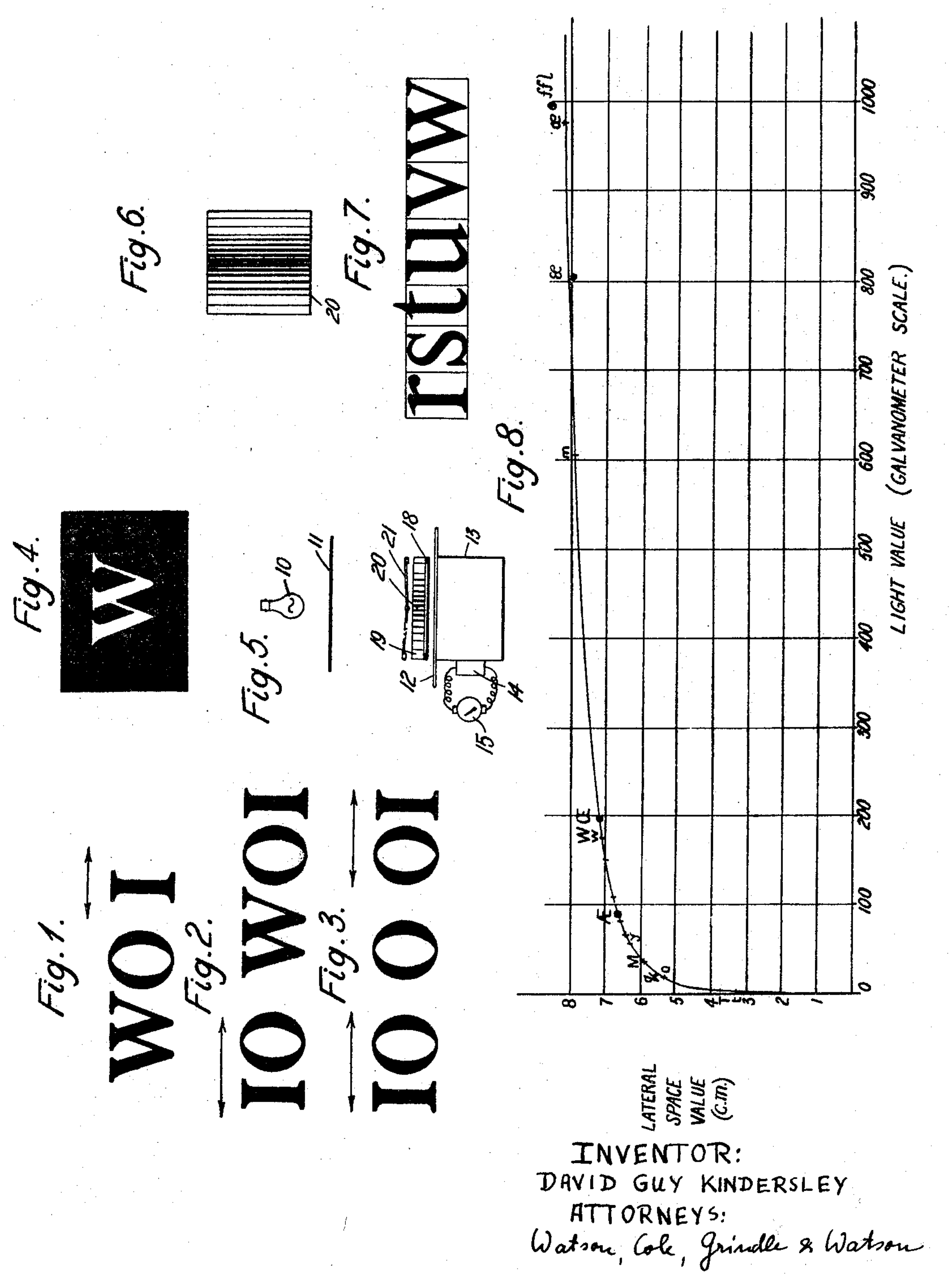
FIGURES 1 to 3 illustrates the determination of the lateral spacing values of the characters.
FIGURES 4 to 6 illustrate the determination of the light values of the characters.
FIGURE 7 shows a line of letters spaced by the method and, FIGURE 8 shows a graph of lateral space values plotted against light values.

The first step is to space by eye an arbitrary set of characters, which in this example is an arbitrary alphabet.

This is done by first taking the widest character of the set (this may be "ffl," "oe," "w" etc.) which is a "W" in this example and placing an "o" of the same set on one side of the "W" at a convenient spacing distance from the "W." An I of the same set is placed on the side of the O remote from the W as shown in FIGURE 1 and is then moved laterally of the O until the O appears to the eye to be equally spaced between the I and the W.

When this has been done a second O and I, spaced apart by the value which has been fixed for the first O and I, are placed on the other side of the W with the O nearer the W as shown in FIGURE 2. The second O and I are now moved as a unit laterally of the W until the O again appears to the eye to be equally spaced between the I and the W.

The distance between the centres of the two O's is now measured.

A letter O is now placed between the two sets of O's and I's and each set in turn is moved as a unit (having the same fixed distance as before between the I and the O) until the two O's of the units each appear to the eye to be equally spaced between the central O and their respective I's. The distance between the centres of the two outer O's is measured and this distance is twice the lateral space value for the letter O (measured in terms of the set distance between the O and the I).

From this measurement the lateral space value for one O can be found and then the lateral space value for the W can be determined by subtracting the lateral space value for one O from the distance between the centres of the O's with the W between them as already determined.

The lateral space values for the other letters of the alphabet are determined in the same way as the O and the W.

The reason for selecting an O and an I for determining the lateral space values is that the O and I are symmetrical and can be placed on either side of the character to be spaced, and the widest character is spaced first to determine a suitable spacing between the O's and the I's.

The optical centre of each character as judged by the eye can be measured as being half-way between the centres of the two O's when the O's and I's are in position as before on either side of the character.

The lateral space values for all the arbitrary characters are tabulated.

The next step is to determine the light value for each arbitrary character.

Each character is drawn in black on a white background and a photographic negative, enlarged if necessary or desired, is produced as shown in FIGURE 4.

The negative is then place in the apparatus shown in FIGURE 5 which comprises a light source 10, a frosted glass plate 11, an opal screen 12 covering an opening in a box 13, a light responsive cell 14 which is responsive to the level of illumination in the box from light entering through screen 12 and a galvanometer 15 giving readings according to the cell response.

The negative 18 is placed above the screen 12 and a light wedge 19 is placed between the negative and the plate 11.

The light wedge comprises a glass plate or a film which allows light to pass through it in proportion to the distance the light is from the centre of the plate and is illustrated diagrammatically in FIGURE 6. The centre of the plate is wholly dark. The wedge of FIGURES 5 and 6 allows light to pass through it such that the amount of light at any point on the wedge is a function of the lateral distance of the point from the axis 20 of the wedge. Accordingly the light in the box 13 is a function of the second moment of the character about the axis 20.

The negative 18 is placed in such a postion with respect to the wedge 19 that if the wedge is covered first on one side and then on the other side of the axis 20 by means of a hinged plate 21 the reading of the galvanometer is the same. The plate 21 is then removed and the galvonometer 15 reading is taken giving the light value of the character for that particular apparatus.

The light values of all the characters are read using the same apparatus and then tabulated.

The light values of the characters are then plotted against the respective lateral space values on a graph.

When it is desired to space another set of characters, each character of the other set is put in the apparatus of FIGURE 5 and the light value of each character is read off from the galvanometer.

The lateral space value of each character is then read off from the graph, and can be used to manufacture character bearing faces with widths corresponding to the lateral space values of the respective characters on the parts. The characters are set on the parts with the optical centres of the characters at the centres of the widths of the parts.

Various modifications may be made to the method described above without departing from the scope of the invention. In particular the light wedge need not be exactly as described.

For example the light wedge may be constructed to allow light to pass through so that the intensity of the light at any point is a function of the second or third power of the distance of the point from the central axis of the wedge, or the intensity may be a function of a power between the second and third power of the said distance.

Alternatively the light wedge may be a circular wedge where the intensity of the light passing through the wedge is nil at the point centre of the wedge and increases radially in all directions from the point centre as some function of the distance from the centre.

In this case it is necessary to centre the negative in the apparatus in two perpendicular directions instead of the one direction as already described. This can be effected by using four hinged plates 21 each covering one quarter of the wedge. The plates are raised and lowered in pairs to obtain equal readings of the galvanometer as before by sliding the negative in the direction perpendicular to the division between the pairs. The operation is then repeated using the plates in their other pairs and by sliding the negative in the other perpendicular direction.

With each different wedge so used there will be a graph of light values against lateral space values peculiar to the wedge used and it is necessary to use the right graph for the particular wedge in use when spacing a set of characters using a wedge and a graph.

FIGURE 7 shows a line of characters spaced according to the invention and FIGURE 8 shows a typical graph of lateral space values plotted against light values. The actual graph shown is for a third moment wedge (i.e. a wedge in which the light allowed to pass through any point on the wedge is proportional to the third power of the lateral distance of the point from the centre of the wedge) and was plotted using a "Grot 215" alphabet as the arbitrary set of characters.

I claim:

1. A method of determining the lateral space value of each printing character of a set of characters which comprises the steps of:

(a) measuring the amount of light which passes through a transparent image of each character of a sample set of printing characters having known individual lateral space values, whereby a light value for each character is obtained, (b) recording the relation of the measured light value to the lateral space value for each character of said set of printing characters, (c) measuring the amount of light which passes through the transparent image of a printing character of unknown lateral space value, which image is substantially proportional to a corresponding image of a character of said sample set of printing characters, whereby a light value for said printing character is obtained, and (d) comparing the measured light value corresponding to said unknown lateral space value with the recorded light values of said sample set of printing characters, whereby proportional light values for the characters of known and unknown lateral space values indicate equal lateral space values for those characters.

2. A method as claimed in claim 1, wherein the step of measuring the light value passing through the transparent images of at least the characters of unknown lateral space value comprises the substeps of positioning a transparent image of the character transversely to a beam of light, varying the intensity of the light at least laterally of the character from both sides of a centre at which a minimum light intensity is established, and moving the image so that equal amounts of light pass through the image on either side of said centre.

3. The method as defined in claim 2 including the more restricted step of varying the lateral intensity of the light in proportion to at least the second power of the distance from the centre of the beam.

4. A method as defined in claim 1 including the modified step of recording the measured light value to lateral space value for each character with the addition to the lateral space value for each character of an arbitrary algebraic constant prior to the comparing of the measured light value corresponding to the unknown lateral space value with the recorded light values.

No references cited.

JEWELL H. PEDERSEN, *Primary Examiner.*

A. A. KASHINSKI, *Assistant Examiner.*